US012682571B2

(12) United States Patent (10) Patent No.: US 12,682,571 B2
Voss-Wolff (45) Date of Patent: Jul. 14, 2026

(54) SPLIT COMPUTE REPROJECTION

(71) Applicant: Microsoft Technology Licensing, LLC, Redmond, WA (US)

(72) Inventor: Christian Voss-Wolff, Herzberg am Harz (DE)

(73) Assignee: Microsoft Technology Licensing, LLC., Redmond, WA (US)

( * ) Notice: Subject to any disclaimer, the term of this patent is extended or adjusted under 35 U.S.C. 154(b) by 290 days.

(21) Appl. No.: 18/185,448

(22) Filed: Mar. 17, 2023

(65) Prior Publication Data

US 2024/0312140 A1    Sep. 19, 2024

(51) Int. Cl.
| *G06T 17/20* | (2006.01) |
| *G06T 7/11* | (2017.01) |
| *G06T 7/50* | (2017.01) |
| *G06T 9/00* | (2006.01) |

(52) U.S. Cl.
CPC .............. *G06T 17/205* (2013.01); *G06T 7/11* (2017.01); *G06T 7/50* (2017.01); *G06T 9/00* (2013.01); *G06T 2207/10024* (2013.01); *G06T 2207/20021* (2013.01)

(58) Field of Classification Search
CPC ..... G06T 7/11; G06T 7/50; G06T 9/00; G06T 2207/20021
See application file for complete search history.

(56) References Cited

U.S. PATENT DOCUMENTS

| 7,274,810 B2 | 9/2007 | Reeves et al. |
| 8,026,912 B1 | 9/2011 | Danskin |

| 8,730,236 B2 * | 5/2014 | Fishwick ................ G06T 9/001 |
| | | 345/419 |
| 9,928,655 B1 | 3/2018 | Alston |
| 10,403,032 B2 | 9/2019 | Schmalstieg et al. |
| 10,445,922 B2 | 10/2019 | Anderson et al. |
| 11,032,534 B1 * | 6/2021 | Voss-Wolff ............. G06F 3/013 |
| 11,776,214 B2 | 10/2023 | Lieutier |
| 2003/0011595 A1 | 1/2003 | Goel et al. |
| 2008/0001952 A1 | 1/2008 | Srinivasan et al. |
| 2009/0207179 A1 | 8/2009 | Huang |
| 2009/0237400 A1 | 9/2009 | Patel |
| 2010/0164954 A1 | 7/2010 | Sathe |

(Continued)

FOREIGN PATENT DOCUMENTS

WO        2021167704 A1    8/2021

OTHER PUBLICATIONS

"Tutorial 9 : VBO Indexing", Retrieved From: http://www.opengl-tutorial.org/intermediate-tutorials/tutorial-9-vbo-indexing/, Retrieved On: May 16, 2022, 4 Pages.

(Continued)

*Primary Examiner* — Grace Q Li
(74) *Attorney, Agent, or Firm* — Barta Jones, PLLC

(57)        ABSTRACT

In various examples there is a computer-implemented method performed by a rendering device. A depth image is rendered from a 3D model according to a predicted pose. The depth image is divided into a plurality of tiles. An error map is computed comprising, for each tile of the plurality of tiles, a planar deviation error value that represents a geometric complexity of the tile and comprises an extent to which a geometry of the tile deviates from a plane. The error map, or information derived from the error map, is sent to a display device.

20 Claims, 9 Drawing Sheets

(56) References Cited

U.S. PATENT DOCUMENTS

| | | | | |
|---|---|---|---|---|
| 2010/0310155 | A1* | 12/2010 | Newton | H04N 19/597 |
| | | | | 348/E13.001 |
| 2014/0063012 | A1 | 3/2014 | Madani | |
| 2015/0029218 | A1 | 1/2015 | Williams et al. | |
| 2017/0115488 | A1 | 4/2017 | Ambrus et al. | |
| 2017/0285736 | A1 | 10/2017 | Young et al. | |
| 2017/0302918 | A1 | 10/2017 | Mammou | |
| 2017/0302972 | A1 | 10/2017 | Zhang | |
| 2017/0358132 | A1 | 12/2017 | Munshi | |
| 2017/0374343 | A1 | 12/2017 | Boulton et al. | |
| 2018/0082469 | A1* | 3/2018 | Andersson | G06T 15/40 |
| 2018/0189925 | A1 | 7/2018 | Lee | |
| 2018/0270531 | A1 | 9/2018 | Ye | |
| 2018/0286112 | A1 | 10/2018 | Lauritzen et al. | |
| 2018/0336008 | A1 | 11/2018 | Nakagawa | |
| 2019/0052838 | A1 | 2/2019 | Ashkenazi | |
| 2019/0340812 | A1 | 11/2019 | Fuetterling et al. | |
| 2020/0202481 | A1 | 6/2020 | Brigg et al. | |
| 2020/0327740 | A1* | 10/2020 | Frommhold | G06T 19/20 |
| 2020/0342656 | A1 | 10/2020 | Cichocki et al. | |
| 2020/0348515 | A1 | 11/2020 | Peuhkurinen | |
| 2021/0133850 | A1 | 5/2021 | Ayush | |
| 2021/0264661 | A1 | 8/2021 | Voss-Wolff | |
| 2021/0358219 | A1 | 11/2021 | Melkote Krishnaprasad | |
| 2021/0373678 | A1 | 12/2021 | Chauvin | |
| 2021/0409235 | A1 | 12/2021 | Cui | |
| 2022/0066543 | A1 | 3/2022 | Rhyu | |
| 2022/0253966 | A1 | 8/2022 | Croxford | |
| 2022/0301262 | A1 | 9/2022 | Aksit | |
| 2022/0394225 | A1 | 12/2022 | Champion | |
| 2022/0414984 | A1 | 12/2022 | Malhotra | |
| 2023/0039100 | A1 | 2/2023 | Melkote Krishnaprasad | |
| 2023/0134779 | A1 | 5/2023 | Reinert | |
| 2024/0098243 | A1* | 3/2024 | Damveld | H04N 13/344 |
| 2024/0144597 | A1 | 5/2024 | Mason | |
| 2024/0320921 | A1 | 9/2024 | Voss-Wolff | |
| 2024/0379030 | A1* | 11/2024 | Ikenoue | G09G 5/36 |

OTHER PUBLICATIONS

"Notice of Allowance Issued in U.S. Appl. No. 16/796,640", Mailed Date: Feb. 9, 2021, 9 Pages.

Gao, et al., "Mesh Simplification with Average Planes for 3-D Image", In Proceedings of International Conference on Systems, Man & Cybernetics: "Cybernetics Evolving to Systems, Humans, Organizations, and their Complex Interactions", Oct. 8, 2000, pp. 1412-1417.

Khoury, et al., "Adaptive GPU Tessellation with Compute Shaders", Retrieved from: https://onrendering.com/data/papers/isubd/isubd.pdf, Oct. 1, 2018, 14 Pages.

Niessner, et al., "Real-Time Rendering Techniques with Hardware Tessellation", In Journal of Computer Graphics Forum, vol. 35, Issue 1, Feb. 2016, pp. 113-137.

Pajak, et al., "Scalable Remote Rendering with Depth and Motion-flow Augmented Streaming", In Journal of Computer Graphics Forum, vol. 30, Issue 2, Apr. 28, 2011, 10 Pages.

"International Search Report and the Written Opinion Issued in PCT Application No. PCT/US21/012024", Mailed Date: Apr. 23, 2021, 15 Pages.

International Search Report and Written Opinion received for PCT Application No. PCT/US2024/019307, Jul. 10, 2024, 16 pages.

Notice of Allowance mailed on Nov. 28, 2023, in U.S. Appl. No. 18/185,432, 14 pages.

Decision to Grant pursuant to Article 97(1) received in European Application No. 21702329.0, mailed on Jan. 30, 2025, 2 pages.

International Search Report and Written Opinion received for PCT Application No. PCT/US2024/019316, Jun. 28, 2024, 13 pages.

Meseth, Jan, "Towards Predictive Rendering in Virtual Reality," Doctoral dissertation, Bonn, University, Oct. 1, 2016, 370 Pages.

Wismann, et al., "Accelerated Stereo Rendering with Hybrid Reprojection-Based Rasterization and Adaptive Raytracing," IEEE Conference on Virtual Reality and 3D User Interfaces, 2020, 08 Pages.

International Search Report and Written Opinion received for PCT Application No. PCT/US2024/019306, Jul. 5, 2024, 13 pages.

Communication under 71(3) Received for European Application No. 21702329,0, mailed on Oct. 28, 2024, 09 pages.

Chen, "Mesh Smoothing Schemes Based on Optimal Delaunay Triangulations", IMR, 2004, 12 pages.

Non-Final Office Action mailed on Mar. 20, 2025, in U.S. Appl. No. 18/189,171, 14 pages.

Notice of Allowance mailed on Aug. 12, 2025, in U.S. Appl. No. 18/189,171, 09 pages.

International Preliminary Report on Patentability (Chapter I) received for PCT Application No. PCT/US2024/019306, mailed on Oct. 2, 2025, 13 pages.

International Preliminary Report on Patentability (Chapter I) received for PCT Application No. PCT/US2024/019307, mailed on Oct. 2, 2025, 11 Pages.

International Preliminary Report on Patentability (Chapter I) received for PCT Application No. PCT/US2024/019316, mailed on Oct. 2, 2025, 9 pages.

* cited by examiner

DISPLAY DEVICE 102

REPROJECTION 104

114

NETWORK(S) 100

112

REMOTE RENDERING DEVICE 106

RENDERING ENGINE 108

PRECOMPUTATION 110

SPLIT COMPUTE REPROJECTION

BACKGROUND

Reprojection is a process often applied when displaying holograms using augmented reality devices. When rendering from a 3D model to obtain images for display at a head mounted display (HMD), a rendering system uses information regarding the pose of the HMD (i.e., the orientation and 3D position of the HMD) so the rendered images are consistent with the HMD viewpoint. However, rendering from a 3D model incurs latency, especially where the 3D model is complex. During the rendering latency the HMD often moves leading to inconsistency between the viewpoint of the rendered images and the viewpoint of the HMD. To reduce this inconsistency, reprojection is typically employed.

The embodiments described below are not limited to implementations which solve any or all of the disadvantages of known reprojection technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Work to reproject an image using planar deviation image reprojection is split between a remote rendering device and a display device. In this way accurately reprojected images are obtained so as to give a high quality viewing experience even for images rendered from highly complex 3D scenes.

In various examples there is a computer-implemented method performed by a rendering device. A depth image is rendered from a 3D model according to a predicted pose. The depth image is divided into a plurality of tiles. An error map is computed comprising, for each tile of the plurality of tiles, a planar deviation error value that represents a geometric complexity of the tile comprising an extent to which a geometry of the tile deviates from a plane. The error map, or information derived from the error map, is sent to a display device.

In some examples a budget map is computed, by, for each tile of the plurality of tiles, assigning a primitive count to the tile in relation to the planar deviation error for the tile. Information derived from the error map may be sent to the display device by sending the budget map to the display device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
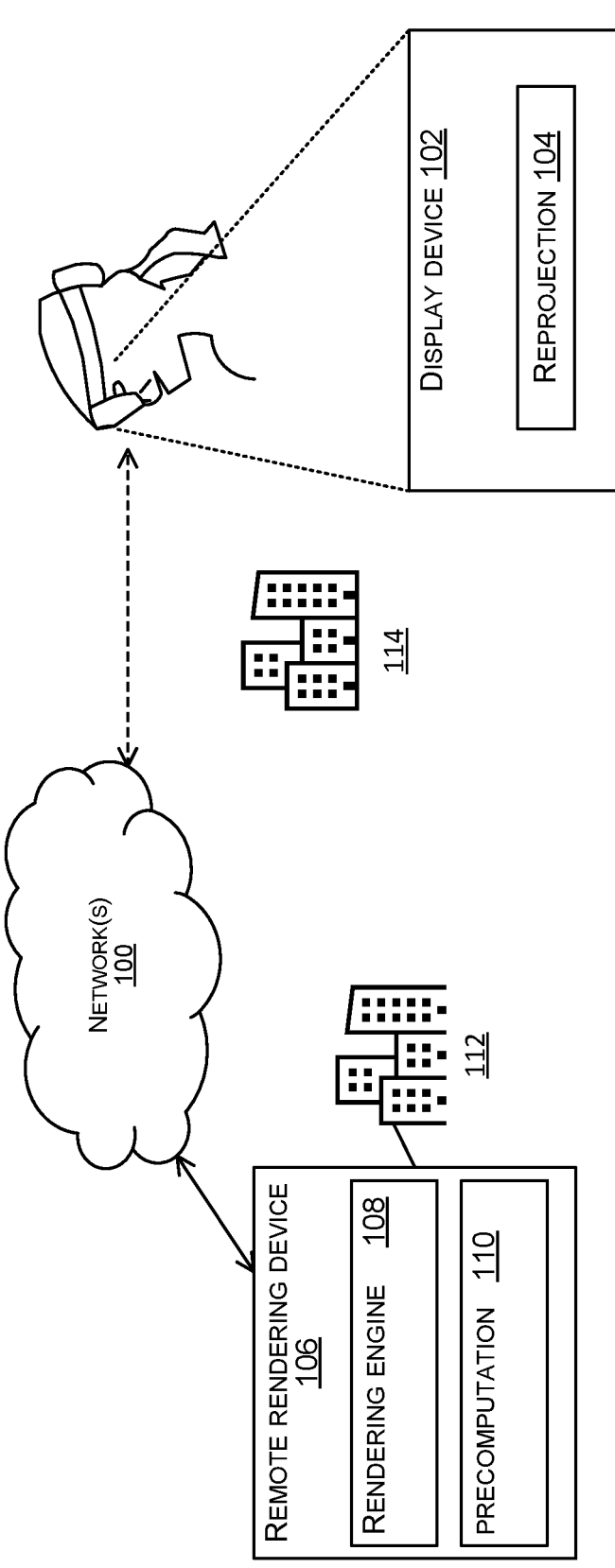
FIG. 1 is a schematic diagram of a remote rendering device in communication with a display device via a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As explained above reprojection is a process used to reduce inconsistency between an image rendered from a 3D model for a given pose, and an image consistent with a current pose of an HMD or other display device. Reprojection is a process of manipulating an image by warping or applying a transform to reduce the inconsistency. In the examples described herein, planar deviation reprojection is used. Reprojection is typically a process performed by hardware at a display device such as an HMD. The display device is typically a low power display device relative to a remote device which rendered the image from the 3D model.

Reprojection serves the purpose of minimizing motion-to-photon latency, which, in the case of HMDs, is important for ensuring user comfort and creating the impression of stable, world-locked holograms. Without reprojection, hologram viewers perceive holograms whose position is constantly jittering, constantly swimming, and experience visual artifacts which are disturbing and can in some cases induce nausea and/or headache. Where holograms break down HMD users find it difficult to operate graphical user interfaces displayed using holograms and to carry out tasks using the HMD hologram user interface.

The inconsistency to be reduced or ameliorated by reprojection is particularly large where there is rendering from complex 3D models. In gaming and other scenarios, a complex 3D model has millions of parameters (such as millions of vertices of a mesh model). Rendering from such a complex 3D model is computationally highly expensive and often involves the use of specialist graphics processing units GPUs and other hardware. Typically, such computationally expensive tasks are off loaded from an HMD to the cloud, a companion computing device, or an edge computing device.

In one example, to increase the detail and quality of the rendered holograms, computational expensive rendering tasks are performed on external computing resources such as a cloud server or a companion device in communication with the HMD. In this way, the HMD computing resources are kept low. The external computing resources typically have higher power, that is, more computing resource, than the display device.

As explained above, reprojection is done to compensate for error introduced by latency rendering from complex 3D models. To do this, reprojection uses an up to date pose of the HMD or other display device and so is typically done at the HMD or other display device itself since that's where the most up to date pose is available. Thus, there has been a prejudice against using a remote computing device, remote from the HMD or other display device, for significant parts of a reprojection process.

The inventors have found that by careful design it is possible to use a remote computing device to carry out some parts of a reprojection process in conjunction with an HMD or other display device. By doing so it is possible to use more computing resources since the remote computing device has more resource. Also, the HMD, which is resource constrained, is freed up for other tasks. Quality of holograms displayed at an HMD or other display device is improved for situations where the holograms are rendered remotely from complex 3D models.

Various examples herein use planar deviation reprojection. Planar deviation reprojection is a process whereby a depth image is divided into tiles and a separate plane is fitted to the depth values in each tile. Features in a tile which deviate from the plane of the tile are determined. A 3D polygon mesh is fitted to the features which deviate from the planes. To compute the planar deviation reprojection, an image is rendered from the 3D polygon mesh using an updated pose of a display device. The image is then used to transform a color image corresponding to the depth image so as to produce a reprojection of the color image.

In various examples there is a computer-implemented method performed by a rendering device. Using a rendering device enables images to be rendered for presentation on a display. A depth image is rendered from a 3D model according to a predicted pose. By rendering from a 3D model it is possible to create images of 3D graphics such as for holograms, video games or other display content. The depth image is divided into a plurality of tiles. By dividing the image into tiles it is possible to achieve efficient processing per tile possibly in a parallel manner. An error map is computed comprising, for each tile of the plurality of tiles, a planar deviation error value that represents a geometric complexity of the tile comprising an extent to which a geometry of the tile deviates from a plane. Since the image has been divided into tiles it is possible to fit a plane to the depth values of the tile since each tile is a small part of the image. The error map is a concise way to capture which parts of the image are more complex in terms of depth values which deviate from the plane of the respective tile. The error map, or information derived from the error map, is sent to a display device. By sending the error map to the display device there is a way to send a concise representation of the parts of the image which are complex to the display device. The display device finds the information useful as part of its work to display images.

FIG. 1 shows a wearer of an HMD viewing a hologram 114 of a city where reference numeral 114 denotes a hologram. Images of the city 114 are rendered from a complex 3D model 112 by a remote rendering device 106 and made available to the HMD via communications network 100. Rendering from the 3D model 112 incurs latency, especially where as 3D model is complex. During the rendering latency the HMD often moves leading to inconsistency between the viewpoint of the rendered images and the viewpoint of the HMD. To reduce this inconsistency, reprojection 104 is typically employed by the HMD. In the present technology, the work of reprojection is split between the remote rendering device 106 and the HMD or other display device 102. Thus precomputation 110 is also shown in FIG. 1 and is a precomputation to assist the reprojection 104. The sub parts of the reprojection process that do not depend on the updated pose estimate 206 are performed in precomputation 110 and the sub part of the reprojection process that do depend on the updated pose estimate 206 are performed in reprojection 104. Benefits of improved visual quality of the reprojected images are gained. Although FIG. 1 depicts an HMD other types of display device 102 may also be used such as a smart phone, tablet computer, or other type of display device 102.

FIG. 1 illustrates deployments where reprojection is implemented for situations where there is a complex 3D model 112 stored in the cloud or at an edge computing device. In the example of FIG. 1 the complex 3D model 112 is of a city and comprises many millions of vertices where the 3D model 112 is a mesh model. Using a model of a city is an example only and is not intended to be limiting. The 3D model is of any object or scene.

FIG. 1 shows a communications network 100 in which the disclosed technology is deployed in some cases. Communications network 100 is the internet, or an intranet or any other communications network. In some examples, the communications network 100 includes a secure network such as an enterprise private network, an unsecure network such as a wireless open network, a local area network (LAN), a wide area network (WAN). In some examples, the communications network 100 comprises hubs, bridges, routers, switches, and/or wired transmission media such as a wired network or direct-wired connection.

Remote rendering device 106 is any computing device having more resources than the display device 102 and which is separate from or independent of the display device 102. Remote rendering device 106 is a cloud server in some cases, such as deployed in a data centre or cluster of compute servers. The remote rendering device has access to the complex 3D model 112. The remote rendering device 106 comprises a rendering engine 108 which is any conventional renderer for rendering images from a complex 3D model. The rendering engine 108 uses ray tracing or other well-known rendering processes to render images from the complex 3D model from a virtual camera with a specified 3D position and orientation referred to as a pose. In a non-limiting example the rendering engine 108 is Visualize (trade mark) or PhotoView360 (trade mark) available from Solid Works (trade mark). The rendering engine 108 executes on one or more processors in the remote rendering device 106 which comprise graphics processing units in some cases. The remote rendering device also has memory, and precomputation functionality 110 for carrying out part of the work to reproject an image using planar deviation reprojection.

The display device 102 is able to send a query comprising its pose (3D position and orientation) to the remote rendering device 106. The remote rendering device 106 renders an image from the complex 3D model 112 in response to the query and using the pose. The rendered image is returned to the display device 102 via the network 100. Latency is thus introduced by the processing at the remote rendering device 106 and by the communication over network 100. Latency is also induced by processing which takes place on the display device 102 (e.g., video decoding, central processing unit CPU-side overhead for network transmission). Reprojection 104 is used at the display device as described herein to allow for the latency and the work of reprojection 104 is split between the display device 102 and the remote rendering device as explained below.

In some cases remote rendering device 106 is an edge computing device such as deployed in an office block or factory. In this case the remote rendering device 106 operates in the same manner although its physical location is geographically closer to the display device 102. Again, latency is introduced due to processing at the remote rendering device 106 and due to communications latency. Planar deviation reprojection is used as described herein to ameliorate the problems introduced by the latency.

Display device 102 comprises an optical see-through HMD in some cases. For example, an HMD is worn by an end user and allows actual direct viewing of a real-world environment (e.g., via transparent lenses) and, at the same time, projects images of a virtual object into the visual field of the end user thereby augmenting the real-world environment perceived by the end user with the virtual object.

Utilizing an HMD, an end user can move around a real-world environment (e.g., a living room) wearing the HMD and perceive views of the real-world overlaid with images of virtual objects (such as images rendered from 3D model 112). The virtual objects appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects also appear fixed with respect to the end user's point of view (e.g., a virtual menu that always appears in the top right corner of the end user's point of view regardless of how the end user turns their head or moves within the real-world environment).

The display device 102 optionally comprises a pose tracker which is any conventional pose tracker functionality. In an example, the pose tracker uses sensor data captured by the display device 102. The sensor data depicts characteristics of the environment of the display device 102 and is fitted to a 3D model of the HMD environment in order to compute the pose of the HMD. The pose of the HMD is a 3D position and an orientation in some cases (i.e. a 6 degree of freedom pose). In some cases features derived from the sensor data are used to query a 3D map of the environment in order to find the pose of the HMD. In some cases the HMD comprises an inertial measurement unit or other sensor such as global positioning system GPS, accelerometer, or other sensor which gives a measurement of the pose of the HMD.

In some cases the remote rendering device 106 is a companion device of the display device 102. In an example, an HMD communicates with companion device via a wired or wireless connection. In some examples, the companion device is used by the display device 102 in order to offload compute intensive processing tasks (e.g., the rendering of virtual objects, parts of the reprojection process) and to store virtual object information and other data that may be used to provide an augmented reality environment on the display device 102. Companion device may also provide motion and/or orientation information associated with companion device to the display device 102.

Alternatively, or in addition, the functionality of the reprojection 104 at the display device 102, and the precomputation 110 at the rendering device 106 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The display device 102 of the disclosure operates in an unconventional manner to achieve improved visual quality images of the disclosure. The remote rendering device 106 of the disclosure also operates in an unconventional manner to achieve improved visual quality images.

By carrying out some of the work of planar deviation reprojection at the remote rendering device it is possible to improve the functioning of the remote rendering device.

Figure 2:
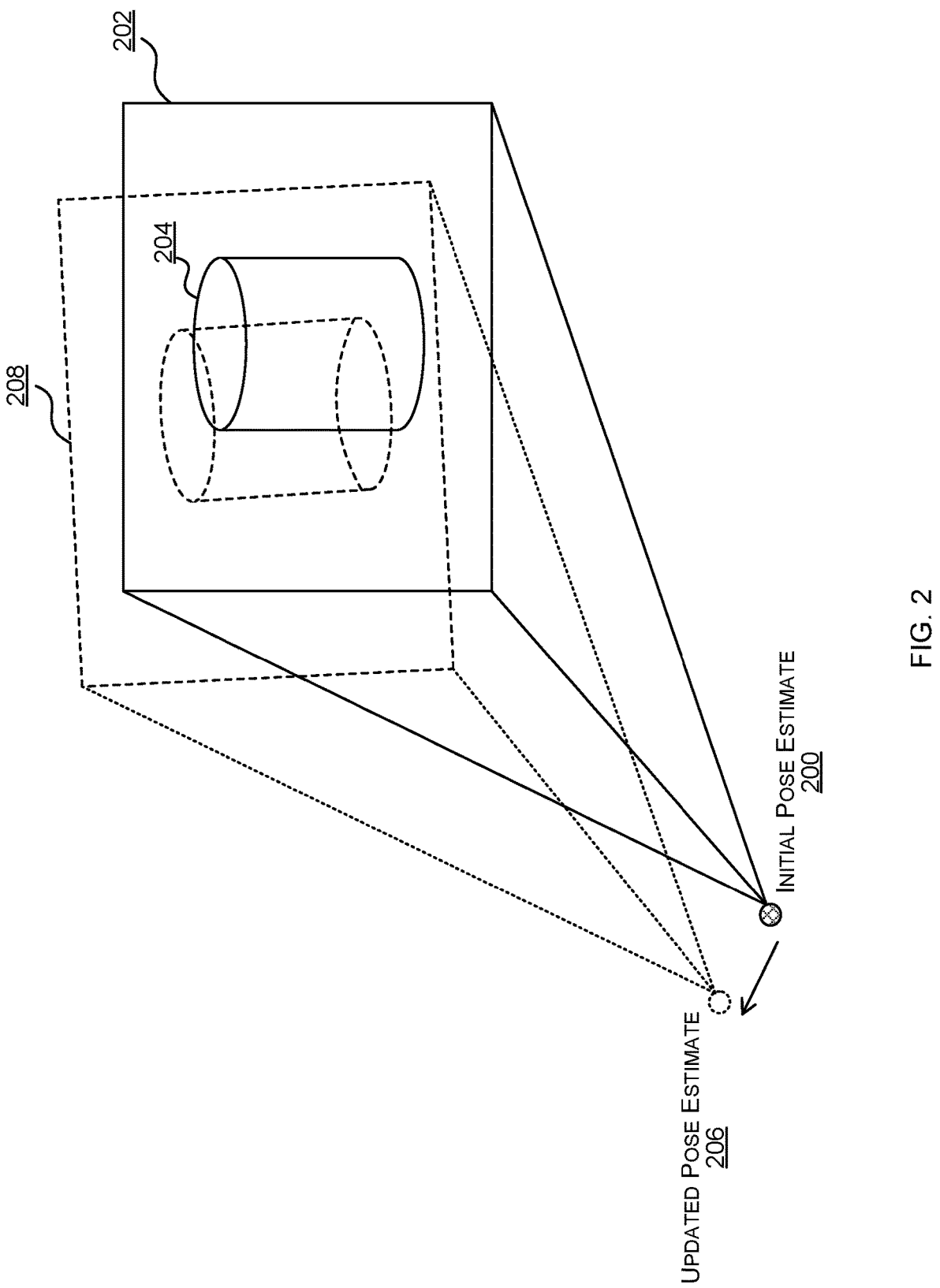
FIG. 2 is a schematic diagram of late stage reprojection of a rendered object.

Reprojection is now explained with reference to FIG. 2. FIG. 2 depicts one example of a portion of a pre-rendered image 202 and an updated image 208 based on the pre-rendered image 202. A pre-rendered image is an image which has been rendered by a computing device which is separate from a display device, such as a cloud server, edge server, or companion device. An updated image is an image computed from a pre-rendered image using reprojection. As depicted, the pre-rendered image 202 is rendered based on an initial pose estimate 200 for a display device (e.g., a predicted pose of an HMD 8 ms or 16 ms into the future). The initial pose estimate is determined in some examples based on a current position and orientation of the display device 102 and an acceleration and a velocity of the display device 102 immediately prior to determining the initial pose estimate. The pre-rendered image 202 comprises a rendered image based on the initial pose estimate 200 and is rendered using a GPU or other rendering system that has the ability to render a three-dimensional model into a two-dimensional image given a particular pose. The updated pose estimate 206 is determined based on updated pose information that is acquired at a point in time subsequent to the determination of the initial pose estimate. In one example, the updated pose information is generated based on camera-based pose tracking information and/or a combination of camera-based pose tracking information and low-latency inertial measurement unit IMU motion information corresponding with the display device.

The updated image 208 is generated using planar deviation reprojection. The pre-rendered image comprises a depth image and a color image. In some examples, the updated image 208 (which is a color image) is generated by applying a pixel offset adjustment to the color image of the pre-rendered image 202. The degree of the pixel offset adjustment may depend on a difference between the updated pose estimate and the initial pose estimate as well as on information in an image rendered from the 3D mesh fitted to the features which deviate from the plane. As depicted, an image 204 of a virtual object (i.e., a virtual cylinder) has been pixel shifted in both the X-dimension and the Y-dimension (e.g., by 4 pixels to the left and by 3 pixels up). In one example, the updated image 208 is generated using a pixel offset adjustment .computed by rendering a tessellated mesh. To compute the planar deviation reprojection, an image is rendered from the 3D polygon mesh using an updated pose of a display device. The image is then used to transform a color image corresponding to the depth image so as to produce a reprojection of the color image.

Figure 3A:
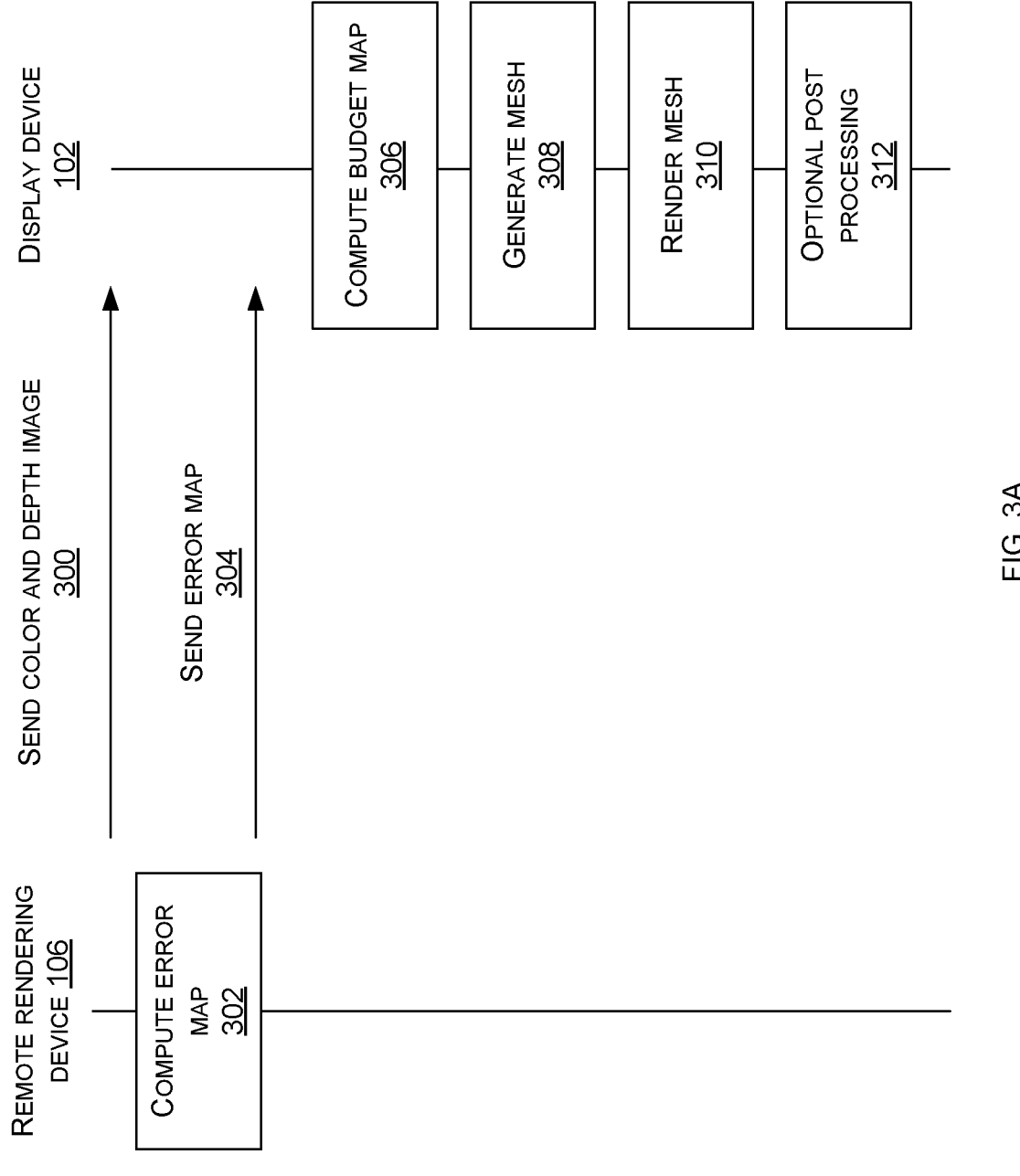
FIG. 3A is a flow chart of a method of reprojection split between a remote rendering device and a display device.
Figure 3B:
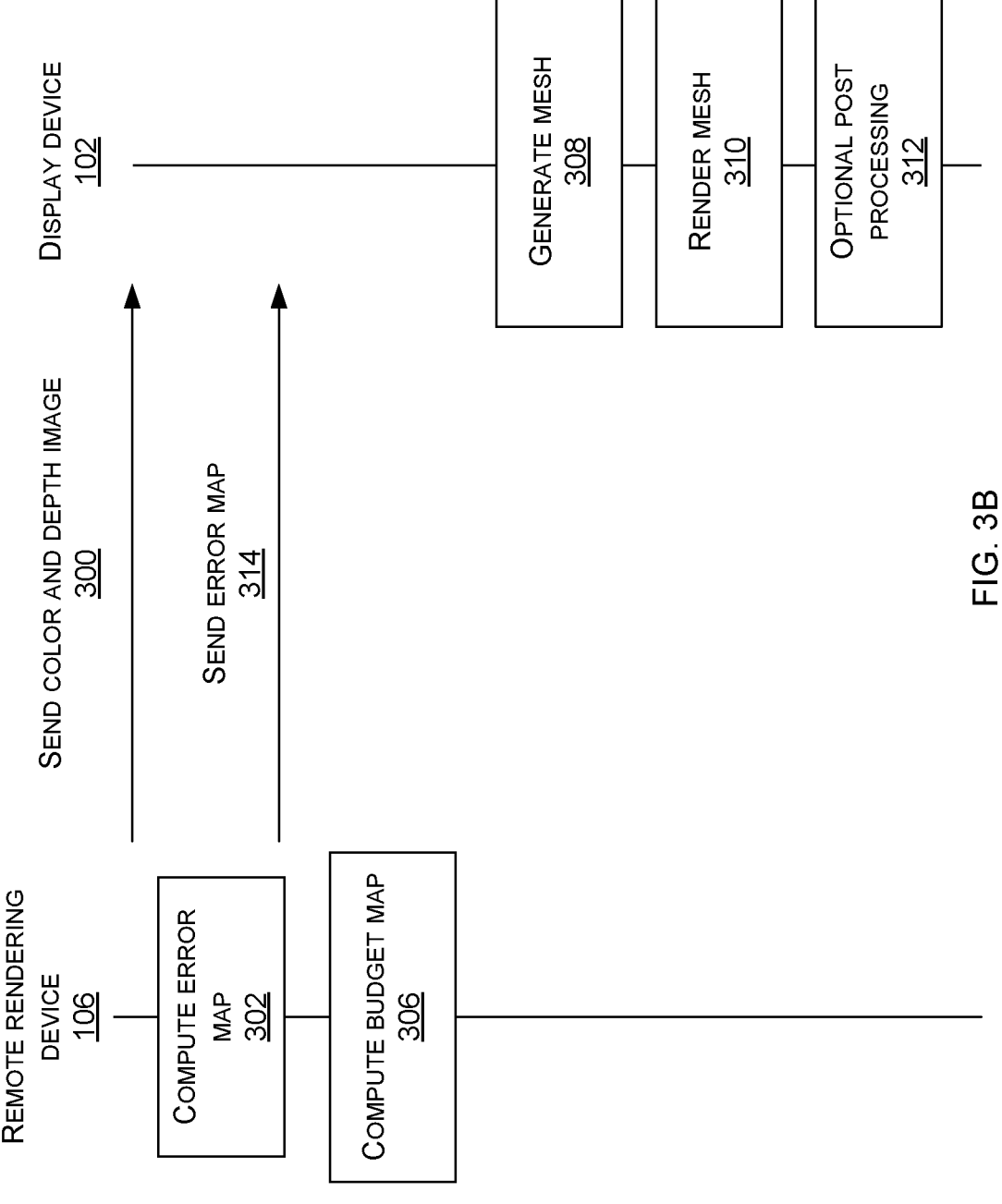
FIG. 3B is a flow chart of a method of reprojection split in another example between a remote rendering device and a display device.

Planar deviation reprojection can be considered as comprising four and optionally five operations as set out in FIG. 3A as operations 302, 306, 308, 310, 312 and FIG. 3B as operations 302, 306, 308, 310, 312.

FIG. 3A is a schematic diagram of an example reprojection process split between a remote rendering device 106 and a display device 102 such as those of FIG. 1. In the example of FIG. 3A an error map is computed by the remote rendering device 106 and sent to the display device 102. In the example of FIG. 3B an error map is computed by the remote rendering device 106 and also a budget map 306 is computed by the remote rendering device. In the example of FIG. 3B the budget map is sent 314 to the display device.

In the example of FIG. 3A the remote rendering device renders a color image from a complex 3D model and also renders a corresponding depth image. The remote rendering device sends 300 the color and the depth image to the display device 102. In an example the color and the depth image are compressed by the remote rendering device 106 using any conventional image compression process such as run-length encoding, predictive coding, entropy encoding, adaptive dictionary algorithms, high efficiency video coding (HEVC), H.264 or any other image compression process and sent 300 to the display device.

The remote rendering device 106 computes 302 an error map. The error map is a 2D array of numerical values corresponding to tiles of the depth image where the depth image is divided into tiles which tesselate over the 2D depth image array. The numerical values in the error map are planar deviation values. A planar deviation value is an amount by which a depth image tile differs in depth from a plane of a surface depicted in the depth image. A planar deviation error value may be calculated as a root mean square error between depth values in a tile and a least-square plane fitted to depth values in a tile. In an example, depth values in a tile are perspectively projected by being non-linearly mapped between near and far planes.

The remote rendering device 106 sends 304 the error map to the display device 102. The error map is compressed by the remote rendering device in some cases such as by using any conventional image compression process such as run-length encoding, predictive coding, entropy encoding, adaptive dictionary algorithms, or any other loss less image compression process. By compressing the error map latency of sending 304 the error map to the display device 102 is reduced. The display device 102 receives the error map and decompresses it if appropriate.

The display device computes 306 a budget map. A budget map is a 2D array of values corresponding to tiles of the depth image (one value per tile). The numerical values in the budget map are integers. An integer of a budget map specifies how many vertices, or how many polygons, are to be used in a 3D mesh model of the corresponding depth map tile. The display device computes 306 the budget map by analyzing the color image and depth image received from the remote rendering device 106 at operation 300, to determine which regions contain complex content, simple content, or no content at all. The images are analyzed to compute statistics such as amount of color variation, entropy, number of edges, rate of change of depth or other statistics. The statistics are compared with thresholds in order to determine regions of complex content, simple content or no content. Regions of no content are regions where color or depth values are zero or near to zero. Given a budget for total computational cost available for reprojection, such as power budget, time budget, or a suitable proxy for these, such as polygon budget available for rendering, the display device distributes that budget between each region of the source image. In an example, the budget map integers are related to a number of polygons to be used. Regions with complex content are assigned a higher proportion of the total budget, regions with simple content are assigned a lower proportion, and region with no content are assigned no budget at all.

The display device 102 generates 308 a mesh. The mesh is formed from polygons (referred to as primitives), and the density of polygons per unit surface area of the mesh varies according to the budget map. The polygons are connected together so as to form a mesh that generally follows how surfaces depicted in the depth image differ with respect to a planar surface depicted in the depth image. The mesh is generated using tessellation or subdivision and represents an approximation of the depth image.

The display device 102 renders 310 from the mesh according to an updated pose of the display device to produce a reprojected image. The display device 102 obtains the updated pose of the display device from sensors in the display device 102 and/or a pose tracker as explained above with reference to FIG. 1. In some cases the updated pose of the display device is received from the remote rendering device 106.

The display device optionally carries out post processing 312 of the reprojected image to produce a final image as output. In an example, the post processing comprises filling disoccluded regions as explained in more detail below with reference to FIG. 6. A disoccluded region is a region of a reprojected image which was previously occluded based on the predicted pose and then uncovered based on the updated pose.

By carrying out the error map computation at the remote rendering device 106 it is possible to significantly reduce the computational burden at the display device 102. This leads to significantly better visual quality of the reprojected image as compared with situations where the display device computes the error map.

FIG. 3B is another example reprojection process split between a remote rendering device 106 and a display device 102 such as those of FIG. 1. In the example of FIG. 3B an error map is computed by the remote rendering device 106. The remote rendering device also computes a budget map 306. In the example of FIG. 3B the budget map is sent 314 to the display device. The budget map is optionally compressed by the remote rendering device 106 prior to being sent 314 to the display device 102. The budget map may be compressed by such as by using any conventional image compression process such as run-length encoding, predictive coding, entropy encoding, adaptive dictionary algorithms, or any other loss less image compression process. By compressing the budget map latency of sending 304 the budget map to the display device 102 is reduced. The display device 102 receives the budget map and decompresses it if appropriate.

The display device 102 generates 308 a mesh using the depth image received at operation 300 and according to the budget map received at operation 314. The display device 102 renders from the mesh 310 according to an updated pose of the display device 102 to produce a reprojected image being a reprojection of the color image received at operation 300.

The display device 102 optionally post processes 312 the reprojected image such as by filling disoccluded regions as explained in more detail below.

By using the remote rendering device to compute both the error map 302 and the budget map 306 the computational requirements of the display device 102 are drastically reduced leading to significantly better visual quality of the reprojected image.

Figure 3C:
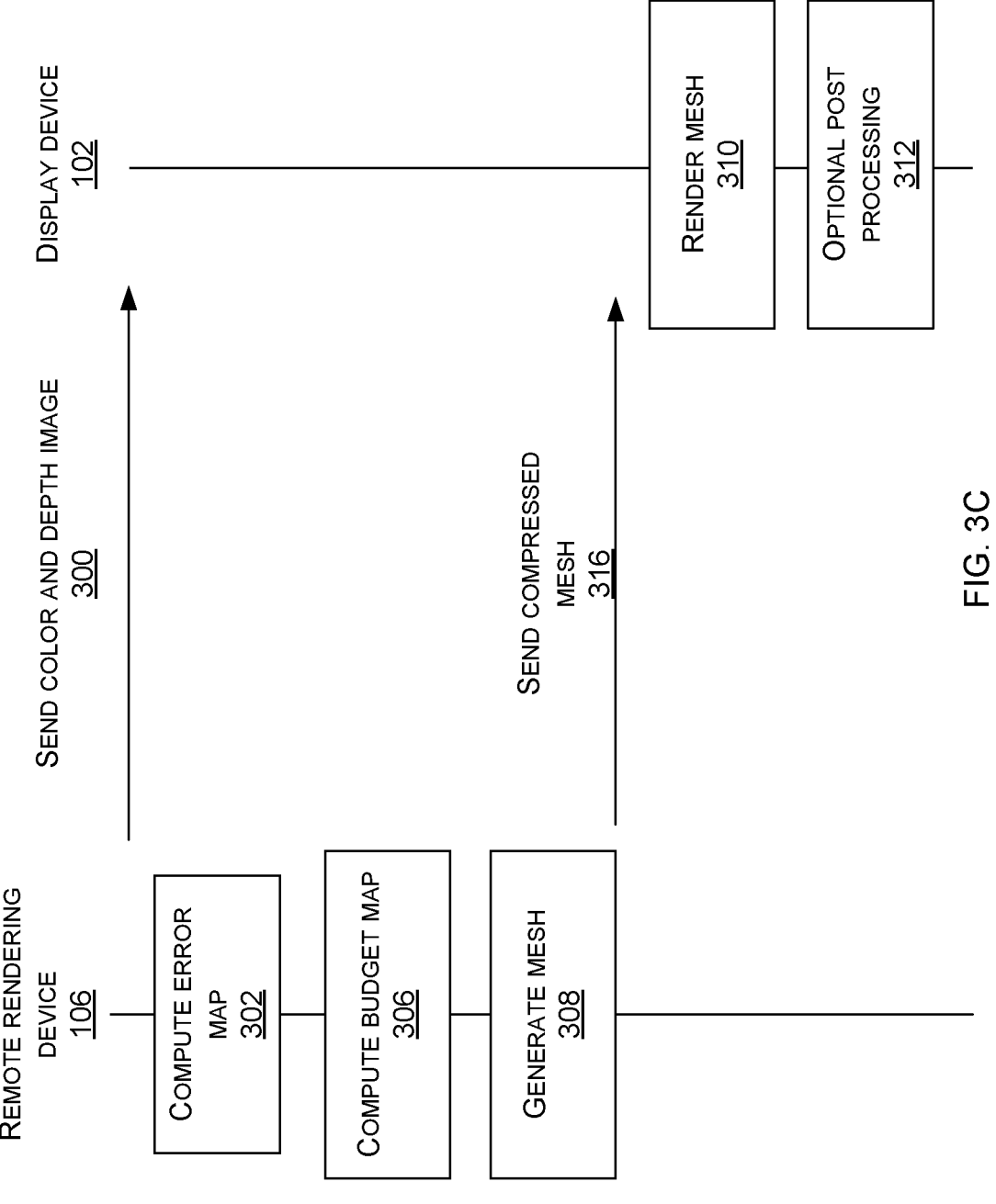
FIG. 3C is a flow chart of a method of reprojection split in another example between a remote rendering device and a display device.

FIG. 3C is another example reprojection process split between a remote rendering device 106 and a display device 102 such as those of FIG. 1. In the example of FIG. 3C the remote rendering device 106 performs computation 302 of the error map, computation of the budget map 306 and generation of the mesh 308. The remote rendering device 106 compresses the mesh using any image compression technology and sends the compressed mesh 316 to the display device 102. The display device receives the compressed mesh, decompresses the mesh, renders from the mesh 310 and optionally does post processing 312 as explained above.

Figure 4:
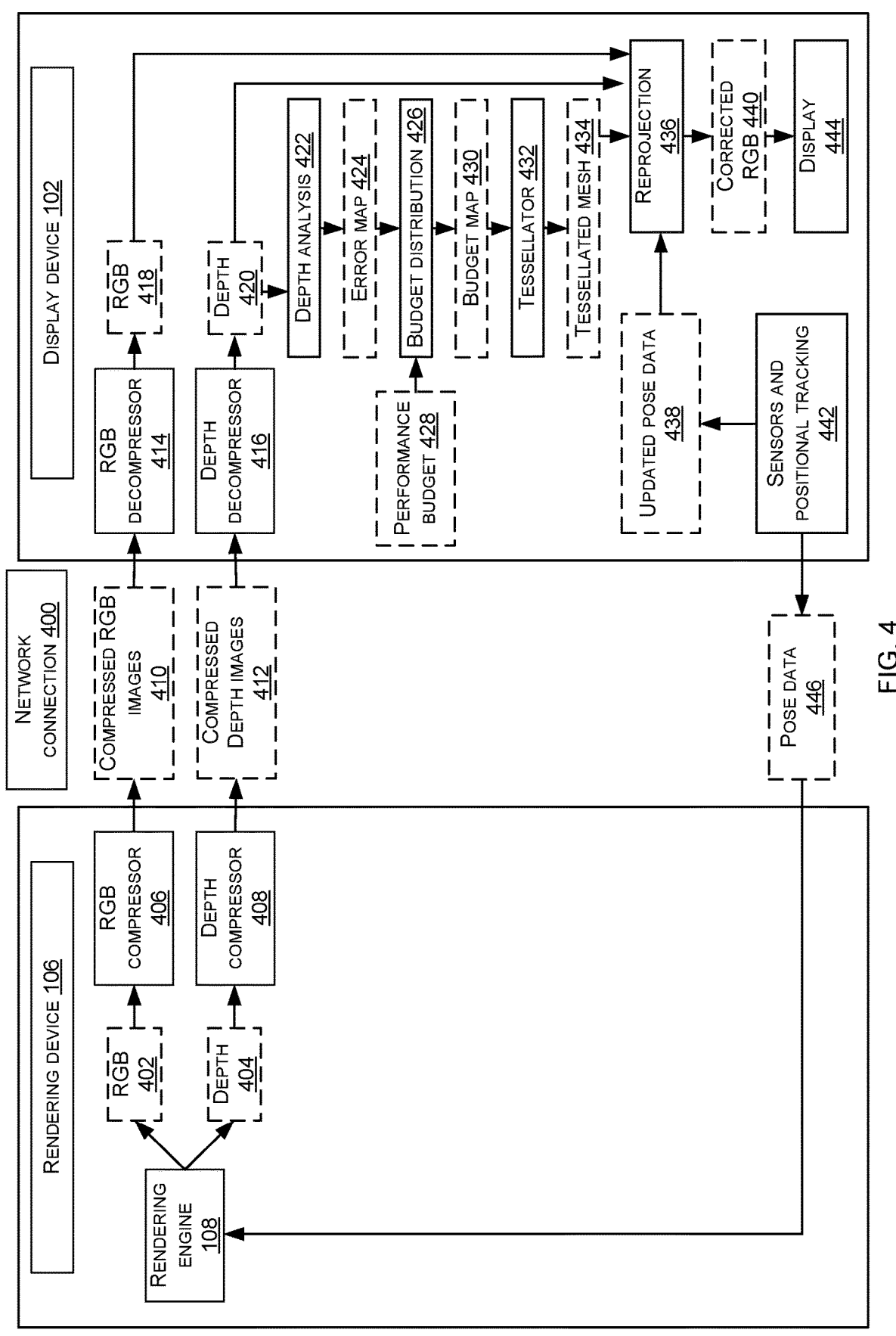
FIG. 4 is a schematic diagram of an example method of planar-deviation based reprojection.

FIG. 4 is a schematic diagram of an example method of planar-deviation reprojection using an approach where the display device 102 carries out a complete reprojection process. In the example of FIG. 4 a rendering device 106 receives pose data 446 from a display device. The pose data comprises a predicted pose (3D position and orientation) of the display device 102. The rendering device 106 comprises a rendering engine 108 which renders a color image 402 and a corresponding depth image 404 from a complex 3D model according to the pose data. The color image and the depth image are compressed by the rendering device 106. A color image compressor 406 compresses the color image. A depth image compressor 408 compresses the depth image. The color image compressor 406 and the depth image compressor 408 are any image compressors as described above with reference to FIGS. 3A and 3B. The compressed color image 410 and the compressed depth image 412 are sent from the rendering device 106 to the display device 102 via a network connection 400 such as a wireless network connection or a wired connection.

The display device 102 receives the color image 410 and decompresses it using a color image decompressor 414 to produce a color image 418. The display device 102 receives the depth image 412 and decompresses it using a depth image decompressor 416 to produce a depth image 420.

The display device 102 analyzes the depth image using a depth analysis process 422. For each tile of the depth image a plane is fitted to depth values of the tile by using a least square plane. For each tile a root means square error between sample depth values in the tile and the least square plane is computed.

The result of the depth analysis 422 is an error map 424 comprising, for each tile, a planar deviation error value. The display device has a performance budget 428 which is pre-configured or determined dynamically according to available resources at the display device 102. The display device 102 allocates 426 the performance budget 428 between tiles of the depth map to produce a budget map 430. In an example, the performance budget 428 is a number of polygons and the number of polygons allocated to a tile is related to the planar deviation error value. Higher planar deviation error values receive higher numbers of polygons.

The display device 102 generates a mesh 434 by tessellating polygons using tessellator 432 to generally follow surfaces depicted in the depth image. The density of the polygons in the mesh is related to the budget map 430. The result is a tessellated mesh 434.

A reprojection process 436 at the display device 102 receives the mesh 434, the color image 418 and the depth image 420, as well as an updated pose 438. The reprojection process produces a reprojected image 440 which may comprise disoccluded regions. The reprojected image may be output to a display 444 at the display device in some cases.

The reprojected image is optionally post processed to fill disoccluded regions to produce a corrected color image which is then displayed at the display device 102. The updated pose 438 is obtained in some cases from sensors and a pose tracker 442 in the display device 102 or in any other suitable way. In various examples, pose data 446 is sent from display device 102 to rendering device 106.

The arrangement of FIG. 4 is workable although where the display device has limited resource, and/or where the rendered images depict complex content the visual quality of the reprojected image may be reduced.

Figure 5:
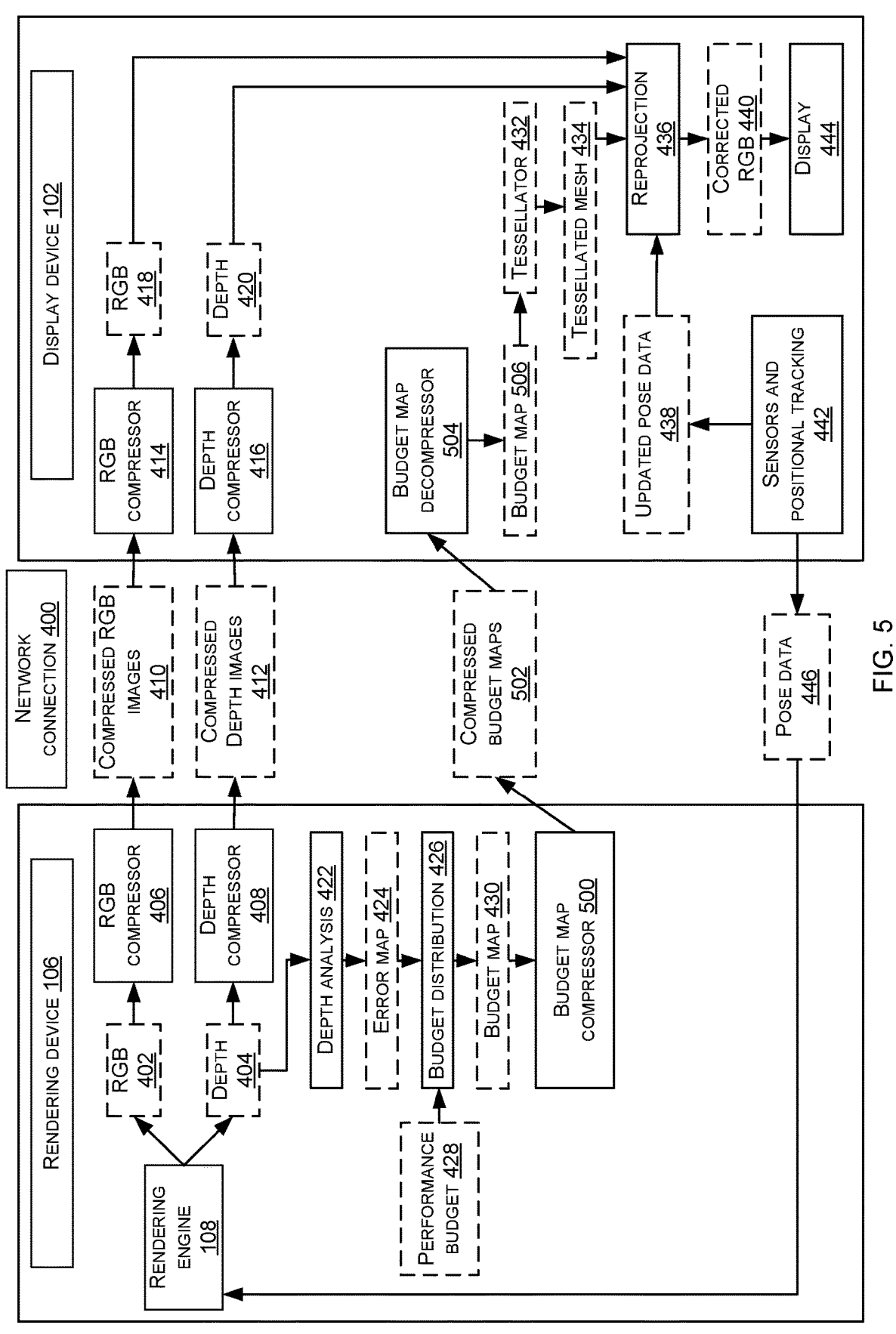
FIG. 5 is a schematic diagram of an example method of planar-deviation based reprojection using one example of split compute.

FIG. 5 is a schematic diagram of an example method of planar-deviation based reprojection using one example of split compute. In this example the rendering device 106 computes the error map 424 and the budget map 430 as explained with reference to FIG. 3B. The display device receives a compressed budget map 502 from the rendering device 106. The display device decompresses using budget map decompressor 504 the budget map 502 and uses decompressed budget map 506 to generate a mesh 434 generally following surfaces depicted in the depth image. A reprojection process in the display device uses the mesh 434, the color image 418 and the depth image 420, together with an updated pose 438, to compute a reprojected image 440. The reprojected image may be displayed 444 at the display device. In another example the reprojected image is post processed to fill disoccluded regions prior to being displayed at the display device. The costly operations of depth analysis and budget distribution are performed on the remote rendering device. This reduces the work on the display device to generate the budget map to a much cheaper decompression. The higher performance of the remote rendering device allows performing a more accurate budget distribution by possibly running multiple correction passes to ensure the performance budget is not exceeded.

In the example of FIGS. 5 and 3B the budget map may be compressed losslessly by budget map compressor 500 before transmission in order to reduce impact on the total network bandwidth.

Where a rate control mechanism is used to control the compression ratio of the color and depth images based on network characteristics, such a rate control mechanism is modified to incorporate the bandwidth requirements for the compressed error map. The modification enables the combined bitrate of compressed color, depth and error maps to be below a maximum supported bitrate of the communications network.

Figure 6:
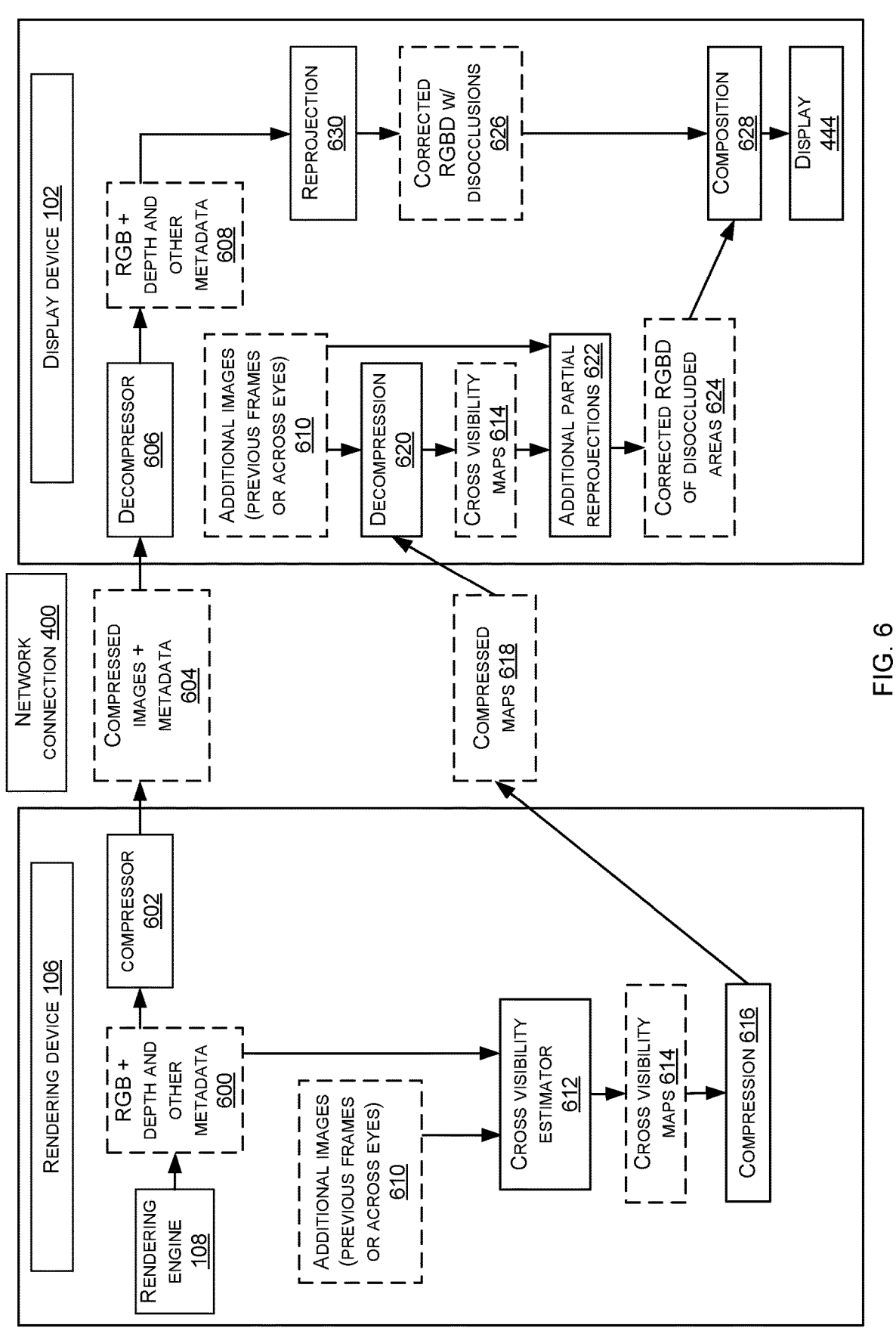
FIG. 6 shows how FIG. 5 may be extended to use cross-visibility maps.

FIG. 6 shows how FIG. 5 may be extended to use cross-visibility maps 614. A cross visibility map is a 2D array of binary values where 1 indicates a part of a scene which is depicted in a first image of the scene and which is absent from a second image of the scene. The first and second images are generally stereo images of the scene or images of the scene taken by a moving camera at successive time instances. Given two RGBD (red, green, blue, depth) images Image1 and Image2, the cross-visibility map between Image1 (source) and Image2 (target) is a pixel map marking the regions in Image1 that contain color information of Image1 that are not included in Image2.

Cross-visibility maps 614 are useful because they provide information about how to fill regions of a reprojected image that became disoccluded during reprojection as now explained. While performing reprojection of the right eye into a corrected pose, areas may be disoccluded due to the relative parallax motion of the object. Because there is no information available in the right eye on the color and texture to use to fill these disoccluded areas, additional sources of information are to be employed. A method to do so is to use the RGBD image of the left eye, and perform an additional reprojection into the same corrected pose of the right eye, thus projecting the missing data from the left into the right eye. However, performing an additional forward reprojection of the left eye or search through the left eye can be prohibitively computationally expensive.

By making use of the cross-visibility map between the left (source) and right (target) eye images, an additional forward reprojection or search can be constrained to those areas that uniquely contain information not provided in the right eye image, significantly reducing the computational cost of using additional source RGBD images to infill disoccluded areas. Conversely, a cross-visibility map between right (source) and left (target) marks areas in the right eye image not included in the left eye image, and may be used to infill missing data upon reprojection of the left image in an additional composition step.

Cross-visibility maps are not restricted to just left and right eyes, but may use other source images such as additional views that were rendered specifically just to provide infill information, or may use previously rendered frames.

The computation of a cross-visibility map uses a reprojection of the source into the target image, and thus cannot be used to lower the cost of an additional infill reprojection on the display device, as it is by definition as expensive as a full reprojection. However, in a split compute architecture, a single or a set of cross-visibility maps 614 can be computed cheaply on the more powerful remote rendering device 106, and transmitted in a suitably compressed form 618 (such as transmitting a list of rectangles or polygonal areas, or by using a downscaled map of pixel tiles marked with either a 0 or 1 to indicate the presence or absence of novel information). Thus FIG. 6 illustrates the rendering device computing one or more cross-visibility maps. The cross-visibility maps are computed by a cross visibility estimator 612 which takes as input an RGBD image and other metadata 600 rendered by the rendering engine 108. The cross-visibility estimator takes as input additional images 610 such as previous RGBD images computed by the rendering engine or an RGBD image rendered from a slightly different viewpoint so as to form a stereo pair with the RGBD image. The cross-visibility estimator 612 computes a comparison between a pair of RGBD images it takes as input (such as by computing a subtraction or other comparison). The results produce a cross-visibility map which is optionally compressed 616 as explained above. The compressed cross-visibility map 618 is sent to the display device 102.

The display device decompresses 620 the cross-visibility map and uses it to compute additional partial reprojections 622 of the RGBD image. The result is a corrected RGBD image of any disoccluded areas 624. A composition operation 628 fills disocclusions in the reprojected image 626 with data from the corrected RGBD image. Reprojected image 626 is generated by reprojection 630 as explained with reference to reprojection 436 in FIG. 4 and FIG. 5 using decompressed color and depth images 608. After compression by a compressor 602, compressed color and depth images 604 are sent to display device 102 and decompressed by a decompressor 606.

Figure 7:
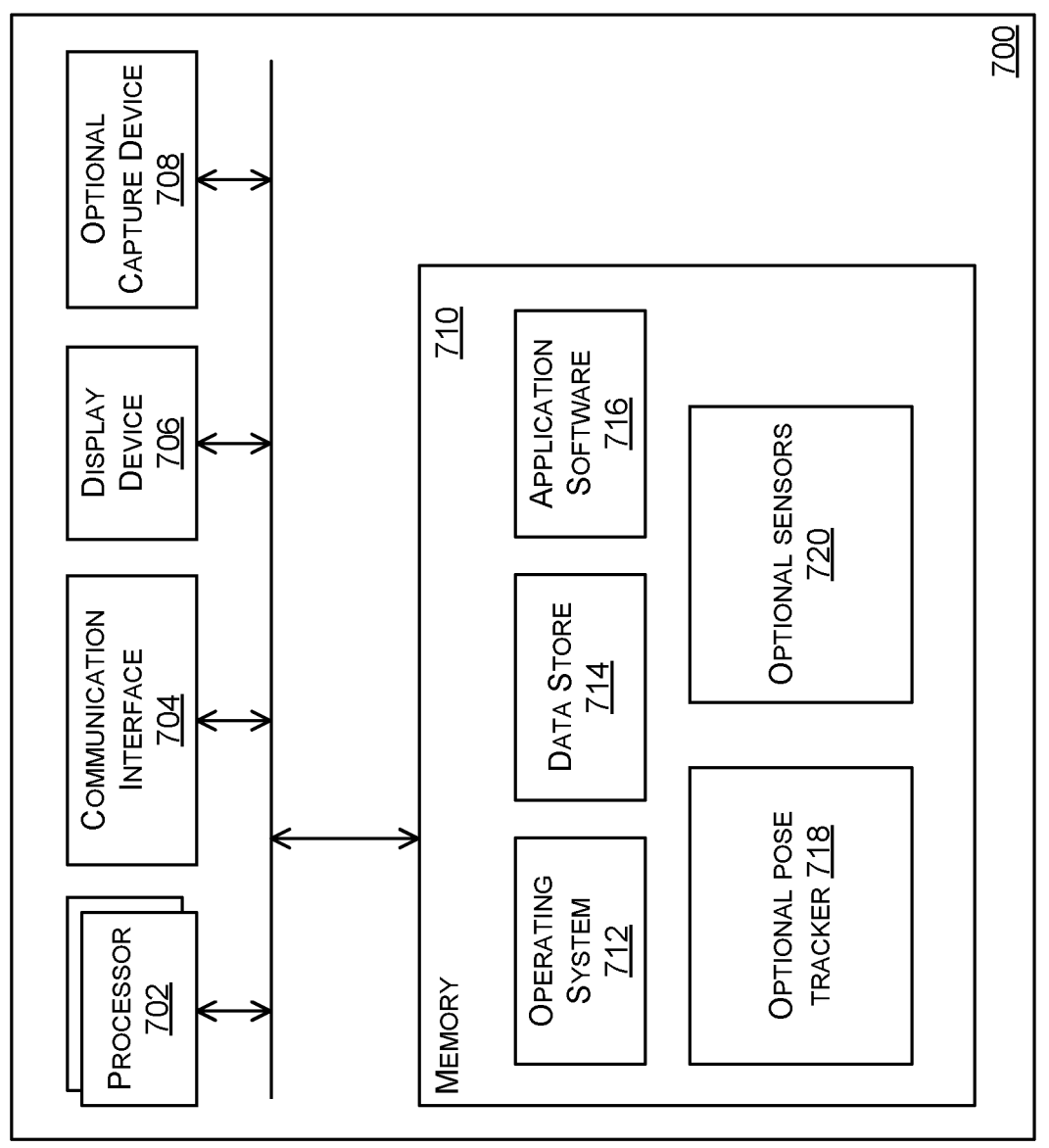
FIG. 7 illustrates an exemplary computing-based device such as a rendering device or a display device.

FIG. 7 illustrates various components of an exemplary computing-based device 700 which are implemented as any form of a computing and/or electronic device, and in which a rendering device or a display device 706 are implemented in some examples. In an example where the computing-based device 700 is a display device it is a head mounted display device HMD, a smart phone, a tablet computer or other display device. In an example where the computing device 700 is a rendering device it is a server such as a cloud server or other server, or a companion computing device of an HMD, or another computing device which has greater resources than the display device.

Computing-based device 700 comprises one or more processors 702 which are microprocessors, controllers or any other suitable type of processors for processing computer executable instructions to control the operation of the device in order to contribute to computing planar-deviation based reprojection of images. In some examples, for example where a system on a chip architecture is used, the processors 702 include one or more fixed function blocks (also referred to as accelerators) which implement a part of the method of any of FIGS. 3A, 3B, 4, 5, 6 in hardware (rather than software or firmware). Where the computing-based device 700 is a display device it optionally comprises sensors 720 such as an inertial measurement unit IMU, an accelerometer, a gyroscope, a global positioning system. The computing-based device 700 optionally comprises a pose tracker 718 to compute a 3D position and orientation of the computing based device. The pose tracker 718 is any conventional pose tracker such as an IMU, accelerometer, gyroscope, global positioning system or pose tracker using captured image data depicting an environment of the computing-based device 700. Data store 714 holds pose data, depth images, color images, cross-visibility maps, sensor data or other data. Platform software comprising an operating system 712 or any other suitable platform software is provided at the computing-based device to enable application software 716 to be executed on the device.

The computer executable instructions are provided using any computer-readable media that is accessible by computing based device 700. Computer-readable media includes, for example, computer storage media such as memory 710 and communications media. Computer storage media, such as memory 710, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 710) is shown within the computing-based device 710 it will be appreciated that the storage is, in some examples, distributed or located remotely and accessed via a network or other communication link (e.g. using communication interface 704). The computing-based device 700 has an optional capture device 708 such as a depth camera, color camera, video camera, web camera or other image capture device.

Alternatively or in addition to the other examples described herein, examples include any combination of the following:

Clause A A computer-implemented method performed by a rendering device comprising:

rendering a depth image from a 3D model according to a predicted pose;

dividing the depth image into a plurality of tiles;

computing an error map comprising, for each tile of the plurality of tiles, a planar deviation error value that represents a geometric complexity of the tile comprising an extent to which a geometry of the tile deviates from a plane;

sending the error map, or information derived from the error map, to a display device.

Clause B The method as in clause A, comprising computing a budget map by, for each tile of the plurality of tiles, assigning a primitive count to the tile in relation to the planar deviation error for the tile; and sending information derived from the error map to the display device by sending the budget map to the display device.

Clause C the method as in any preceding clause comprising compressing the budget map prior to sending the budget map to the display device.

Clause D The method as in any preceding clause comprising compressing the depth image and sending the compressed depth image to the display device in parallel with sending the error map or information derived from the error map to the display device.

Clause E The method as in any preceding clause further comprising computing the predicted pose from pose data received from the display device, or receiving the predicted pose from the display device.

Clause F The method as in any preceding clause comprising computing a cross-visibility map indicating tiles of the plurality of tiles depicting parts of a scene which are absent from a second depth image rendered from the 3D model.

Clause G The method of clause F wherein the second image is rendered according to a previous predicted pose or according to a stereo viewpoint.

Clause H The method of clause F or clause G comprising compressing the cross-visibility map and sending the compressed cross-visibility map to the display device.

Clause I A computer-implemented method performed by a display device comprising:

receiving a color image and a depth image;

receiving a budget map comprising, for each tile of a plurality of tiles of the depth image, a primitive count;

generating a tessellated mesh of primitives representing the depth values in the depth image such that, for each tile the number of primitives in the mesh is related to the primitive count of the tile;

rendering the tessellated mesh according to an updated pose.

Clause J The method of clause I, comprising generating the tessellated mesh in parallel with receiving the color image.

Clause K The method of clause I, comprising receiving the budget map in compressed form and decompressing the budget map in parallel with receiving the color image and the depth image.

Clause L The method of clause I, comprising receiving a cross-visibility map from a remote rendering device, the cross-visibility map indicating tiles of the plurality of tiles depicting parts of a scene which are absent from a second depth image.

Clause M The method of clause L comprising infilling areas in the reprojected image according to the cross-visibility map.

Clause N A rendering device comprising:

a processor a memory storing instructions executable by the processor to:

render a depth image from a 3D model according to a predicted pose;

divide the depth image into a plurality of tiles;

compute an error map comprising, for each tile of the plurality of tiles, a planar deviation error value that represents a geometric complexity of the tile and penalizes the tile in relation to an extent to which a geometry of the tile deviates from a plane;

send the error map, or information derived from the error map, to a display device.

Clause O The rendering device of clause N, the memory storing instructions executable by the processor to compute a budget map by, for each tile of the plurality of tiles, assigning a primitive count to the tile in relation to the planar deviation error for the tile; and sending information derived from the error map to the display device by sending the budget map to the display device.

Clause P rendering device of clause N, the memory storing instructions executable by the processor to compress the budget map prior to sending the budget map to the display device.

Clause Q The rendering device of clause N, the memory storing instructions executable by the processor to compress the depth image and send the compressed depth image to the display device in parallel with sending the error map or information derived from the error map to the display device.

Clause R The rendering device of clause N, the memory storing instructions executable by the processor to compute the predicted pose from pose data received from the display device, or receive the predicted pose from the display device.

Clause S The rendering device of any of clauses N to R, the memory storing instructions executable by the processor whereby the plane is a plane fitted to values in a depth buffer storing the depth image.

Clause T The rendering device of any of clauses N to S, the memory storing instructions executable by the processor whereby the depth buffer stores perspectively projected depth values of the depth image.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for planar deviation image reprojection, performed by a rendering device that is remote from a display device and has greater processing resources than the display device, the method comprising:

rendering, by the rendering device, a color image and a depth image from a three-dimensional (3D) model according to a predicted pose of the display device;

transmitting, via a network, the color image and the depth image from the rendering device to the display device;

performing, at the rendering device, computation of geometric data for use in reprojection of the color image at the display device, the computation comprising:

dividing the depth image into a plurality of tiles; and computing geometric data comprising an error map, a budget map derived from the error map, or a mesh based on the budget map;

transmitting, via the network, the geometric data to the display device, wherein:

when the geometric data comprises the error map, the error map comprises, for a tile of the plurality of tiles, a planar deviation error value based on an extent to which a geometry of the tile deviates from a plane;

when the geometric data comprises the budget map, the budget map comprises, for the tile, a count of primitives budgeted for the tile based on the planar deviation error value for the tile; and when the geometric data comprises the mesh, the mesh is formed of polygons tessellated according to the budget map and based on the depth image.

2. The method as claimed in claim 1, wherein the geometric data comprises the budget map.

3. The method as claimed in claim 1, wherein the predicted pose is computed from pose data received from the display device or is received from the display device.

4. The method as claimed in claim 1, wherein the geometric data further comprises a cross-visibility map specifying that a tile of the plurality of tiles depicts a disoccluded part of a scene which is not visible in a second image rendered from the 3D model.

5. The method as claimed in claim 4, wherein the second image is rendered according to a previous predicted pose or according to a stereo viewpoint.

6. The method as claimed in claim 4, further comprising compressing the cross-visibility map and sending the compressed cross-visibility map to the display device.

7. The method of claim 1, wherein the geometric data comprises the error map.

8. The method of claim 1, wherein the geometric data comprises the mesh.

9. The method of claim 1, wherein the geometric data is compressed prior to the transmitting of the geometric data to the display device.

10. A rendering device for assisting in planar deviation image reprojection, the rendering device being remote from a display device, the rendering device comprising a processor and a memory storing instructions executable by the processor to:

render, by the rendering device, a color image and a depth image from a three-dimensional (3D) model according to a predicted pose of the display device;

transmit, via a network, the color image and the depth image from the rendering device to the display device;

perform, at the rendering device, computation of geometric data for use in the reprojection of the color image at the display device, the computation comprising:

divide the depth image into a plurality of tiles; and compute geometric data comprising an error map, a budget map derived from the error map, or a mesh based on the budget map; and transmit, via the network, the geometric data to the display device.

11. The rendering device of claim 10, wherein:

when the geometric data comprises the error map, the error map comprises, for a tile of the plurality of tiles, a planar deviation error value based on an extent to which a geometry of the tile deviates from a plane;

when the geometric data comprises the budget map, the budget map comprises, for the tile, a count of primitives budgeted for the tile based on the planar deviation error value for the tile; and when the geometric data comprises the mesh, the mesh is formed of polygons tessellated according to the budget map and based on the depth image.

12. The rendering device of claim 10, wherein the predicted pose is computed from pose data received from the display device or is received from the display device.

13. The rendering device of claim 10, wherein the plane is a plane fitted to values in a depth buffer storing the depth image.

14. The rendering device of claim 13, wherein the depth buffer stores perspectively projected depth values of the depth image.

15. The rendering device of claim 10, wherein the geometric data comprises the error map.

16. The rendering device of claim 10, wherein the geometric data comprises the mesh.

17. The rendering device of claim 10, wherein the geometric data is compressed prior to the transmitting of the geometric data to the display device.

18. A computer-readable storage medium storing instructions executable by a processing apparatus to perform operations comprising:

rendering a color image and a depth image from a three-dimensional (3D) model according to a predicted pose;

transmitting the color image and the depth image to a display device;

generating geometric data, the generating of the geometric data comprising:

dividing the depth image into a plurality of tiles; and computing a cross-visibility map specifying that a tile of the plurality of tiles includes a disoccluded part of a scene which is not visible in a second image rendered from a different perspective of the 3D model; and sending the geometric data to the display device, the geometric data comprising the cross-visibility map.

19. The computer-readable storage medium of claim 18, wherein the different perspective is based on a previous predicted pose or a stereo viewpoint.

20. The computer-readable storage medium of claim 18, wherein the transmitting further comprising compressing the cross-visibility map and sending the compressed cross-visibility map to the display device.

\* \* \* \* \*